United States Patent [19]

Rydborn

[11] Patent Number: 4,534,321

[45] Date of Patent: Aug. 13, 1985

[54] APPARATUS FOR CONTROLLING A NUMBER OF BOILERS

[76] Inventor: Sten Å. Rydborn, Klöxhultsvägen 21, S-343 00 Älmhult, Sweden

[21] Appl. No.: 439,489

[22] Filed: Nov. 5, 1982

[30] Foreign Application Priority Data

Feb. 22, 1982 [SE] Sweden .............................. 82010745

[51] Int. Cl.³ ............................................. F22D 37/42
[52] U.S. Cl. ................................. 122/448 B; 236/1 E; 237/8 R
[58] Field of Search ................. 236/1 EB, 1 EA, 1 E; 126/101; 237/8 R, 19, 61, 81; 122/448 B; 60/667

[56] References Cited

U.S. PATENT DOCUMENTS

| | | | |
|---|---|---|---|
| 2,480,883 | 9/1949 | Schramm | 237/61 |
| 4,252,300 | 2/1981 | Herder | 236/1 EB |
| 4,324,207 | 4/1982 | Leuthard | 122/448 B |
| 4,365,742 | 12/1982 | Cogar | 237/81 |
| 4,368,502 | 1/1983 | Jornod et al. | 236/1 EA |

FOREIGN PATENT DOCUMENTS 2820288 9/1979 Fed. Rep. of Germany ...... 236/1 E

Primary Examiner—Henry Bennett
Attorney, Agent, or Firm—Beveridge, DeGrandi and Weilacher

[57] ABSTRACT

The disclosure relates to an apparatus for controlling a number of boilers which are, in terms of water engineering, interconnected in series and each are provided with their control equipment having a first and a second switch, the first switch being arranged to generate a signal "permission to increase", and the second switch being arranged to generate a signal "permission to reduce", whereby the boilers are given priority ranking in such a manner that the first boiler must always attain full output before a subsequent boiler can commence to be connected in and so that a subsequent boiler must always be reduced to zero output before a preceding boiler can commence to reduce its output.

11 Claims, 2 Drawing Figures

APPARATUS FOR CONTROLLING A NUMBER OF BOILERS

TECHNICAL FIELD

The present invention relates to an apparatus for controlling a number of boilers which each are provided with their control equipment and are, in terms of water engineering, connected in series with one another in such a manner that the return water from a circulation system enters the first boiler in the series and continues through the remaining boilers and is thereafter redischarged into the circulation system.

THE STATE OF THE ART

In many contexts, it has proved to be desirable to replace one single boiler by a number of smaller series-connected boilers for attaining primarily an overall cheaper installation but also an installation which is less sensitive to disturbance and is thereby operationally more reliable. However, this method of approach entails serious problems of regulation engineering, since the power increase of a boiler is perceived by a subsequent boiler as an increase of the temperature and, as a result, its control equipment reduces the power output. This gives rise to fluctuations in the system and the entire control arrangement is put out of operation.

TECHNICAL PROBLEM

The task which forms the basis of the present invention is to realize an apparatus which in normal cases fundamentally prevents an increase of the output in a subsequent boiler, until a preceding boiler has reached a certain, high output level and, in principle, prevents reduction of the output level in a preceding boiler until a subsequent boiler has reduced its output to a certain, low level.

SOLUTION

The task forming the basis of the present invention is solved in that the control equipment is provided with one first and one second switch for making or breaking a signal circuit, of which the first switch is arranged to generate a signal which, as it were, gives permission to the control equipment of a subsequent boiler in the series connection to increase the output of the boiler, and of which the second switch is arranged to generate a signal which, as it were, gives permission to the control equipment of a preceding boiler in the series connection to reduce its output. The first switches are series-connected with one another and are connected to a signal source, whereas the second switches are series-connected with one another and are connected to a signal source. The control equipment is arranged to make the first switch at a certain high output level, for example full output, to the boiler for transmitting the signal "permission to increase" to the control equipment of the subsequent boiler, and to make the second switch at a certain low output level, for example zero output, to the boiler for transmitting the signal "permission to reduce" to the control equipment of the preceding boiler.

ADVANTAGES

An apparatus according to the present invention makes for a priority ranking of the boilers which are series-coupled in such a manner that the first boiler, in which the return water first arrives, has the highest priority, and the last boiler, from which the water is redischarged into the circulation system, for example a riser, has the lowest priority. This thus makes possible that a subsequent boiler is not connected in until the preceding boiler has reached a certain output level, for example full output and similarly, a preceding boiler cannot reduce its output until the subsequent boiler has lowered its output to a desired level, for example zero output. There will thus be provided an extremely stable automatic regulating system.

DESCRIPTION OF THE ACCOMPANYING DRAWINGS

The present invention will be described in greater detail below with reference to the accompanying drawings.

Figure 1:
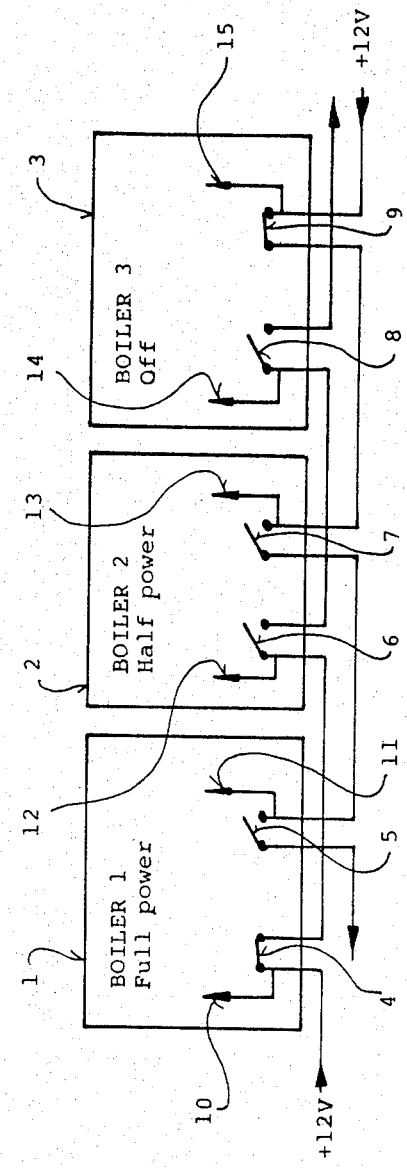
FIG. 1 is an outline block diagram of one embodiment of an apparatus according to the present invention.

FIG. 1 illustrates a series-coupling of three boilers 1, 2 and 3. These boilers are, as regards water engineering, connected in series in such a manner that the return water from a circulation system is fed into boiler 1 and passes thence to the boiler 2 and to the boiler 3, whereafter the heated water is redischarged into the circulation system, for example a riser pipe.

Each boiler 1–3 is provided with regulator equipment of per se conventional type for increasing and reducing respectively, the output of the boiler depending upon some desired quantity, for example the temperature in a premises which is heated by means of the water in the circulation system. Such a quantity may also include the temperature outdoors, wind speed and so on. Irrespective of the chosen regulating quantity or quantities, the regulating equipment in the boiler will either increase the output of the boiler or reduce its output.

Two switches are disposed in the control equipment of each boiler 1–3.

In FIG. 1, the switches in the boiler 1 are designated 4 and 5, whereas the switches in the boiler 2 are designated 6 and 7, and in the boiler 3, 8 and 9. The switches 4, 6 and 8 are interconnected in series and are connected to a voltage level of +12 V. The input terminals of the switches 4, 6 and 8 are each coupled to their respective boiler control equipment which is illustrated by means of the arrows 10, 11 and 12.

The switches 5, 7 and 9 are also interconnected in series and are connected to a voltage level of +12 V. The signal input terminal of these switches 5, 6 and 9 is each coupled to its respective boiler control equipment, as illustrated by means of the arrows 13, 14 and 15.

The thus realized series circuits may be increased or reduced to any optional degree.

The voltage level +12 V is fed into the boiler 1 in its control equipment and represents a signal "permission to increase". When this boiler has reached full output, its control equipment will throw the switch 4 into the position shown in FIG. 1, whereby the voltage level +12 V or the signal "permission to increase" is fed further to the boiler 2 and thereby to its control equipment by the intermediary of the input terminal of the switch 6 or the arrow 11. Because of the voltage level +12 V, this boiler 2 will be given permission to increase output, but the voltage level +12 V is not fed further by means of the switch 6 to the boiler 3 until the boiler 2 has attained a certain high output or full output. If, thus, the boilers 1 and 2 are running at full output, the switch 6 will be made so that the boiler 3 also receives the voltage level +12 V and thereby the signal "permission to increase" and can contribute to the heating output. The switch 8 is not made until the boiler 3 has reached a certain, high output or full output.

It may be desirable to reduce the joint heating output of boilers 1 and 2 from the situation illustrated in FIG. 1, but it is preferable first to reduce the heating output of the boiler 2 before the boiler 1 is permitted to commence output reduction. To this end, the switch 5, 7 and 9 are provided and a voltage level +12 V or a signal "permission to reduce" is passed from the boiler 3 by the intermediary of the arrow 15 and its control equipment to the arrow 14 and the control equipment of the boiler 2. Thanks to the voltage level +12 V from the switch 9 to the boiler 2 by the intermediary of the arrow 14, the boiler 2 is given permission to reduce its output. The voltage level +12 V or the signal "permission to reduce" is not, however, passed further from the boiler 2 by the intermediary of the switch 7 to the arrow 13 until such time as the boiler 2 has reduced its output to a desired, low level or zero output.

In brief, the above-outlined priority function may be described such that the switches 4, 6 and 8 are made when full output is produced by their boilers, whereas the switches 5, 7 and 9 are made when their boilers produce no output.

In the above-described system, there may undoubtedly be a risk of overheating if, for example, a pump would stop, or if the main water supply faucet were to be closed etc. If, under such circumstances, there is no active signal "permission to reduce", great problems may arise. As a result, each control equipment unit is provided with an excess temperature sensor such that, if a boiler exceeds the preset temperature by a certain value, for example 6°-7° C., the control equipment of the boiler will receive the "permission to reduce" signal. Naturally, in this way all boilers in the system having excess temperature will reduce their output in parallel with one another. Apart from the given signal "permission to reduce", the control equipment of the overheated boiler will break the signal "permission to increase". In this way, it will be ensured that no subsequent boiler will compensate for the output loss by an output increase.

Figure 2:
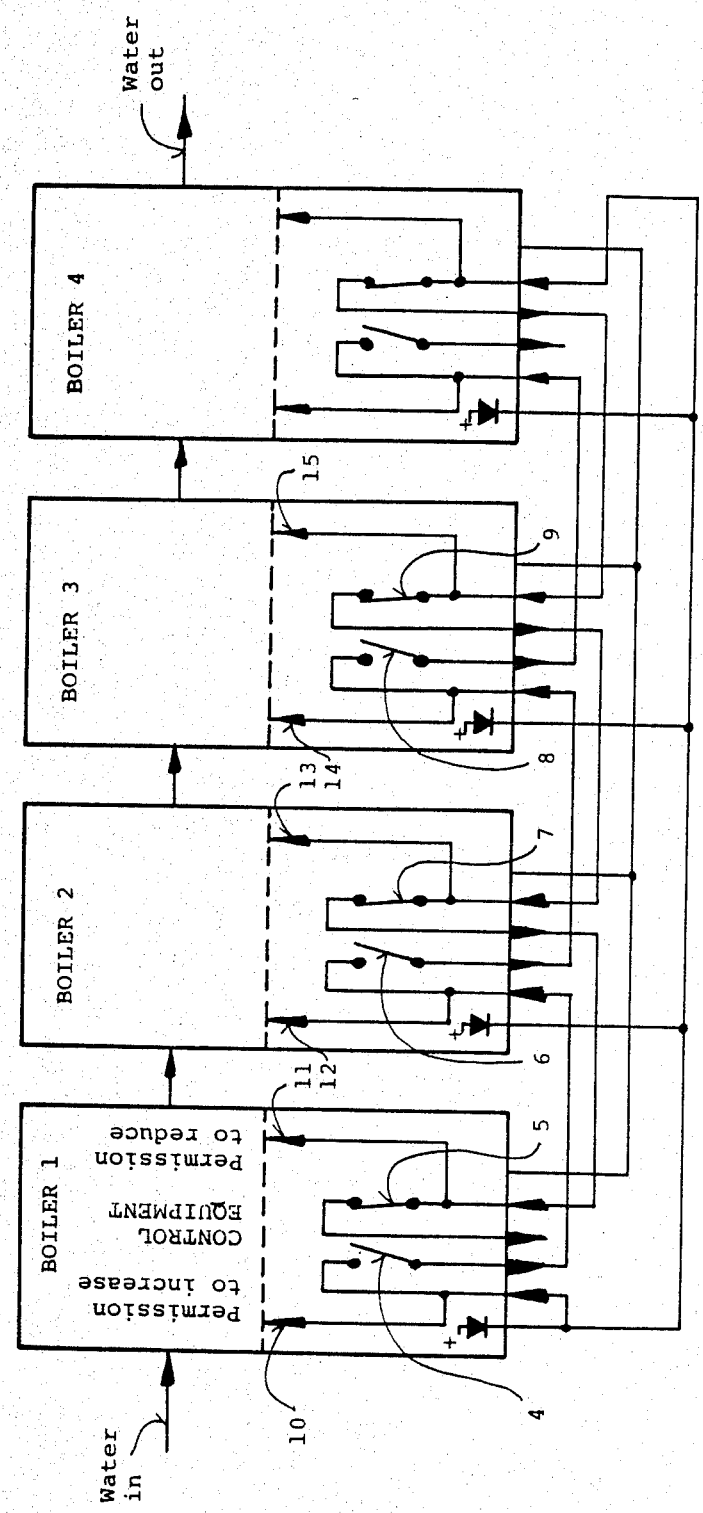
FIG. 2 illustrates a further block diagram of one embodiment of an apparatus according to the present invention.

FIG. 2 illustrates a similar series-connection of four boilers and, as will be apparent to the skilled reader, the switches in the different boilers are arranged in the same manner as in the embodiment according to FIG. 1 and, similarly, the voltage level source is common for the generation of the two signals "permission to increase" and "permission to reduce".

FIG. 2 further shows that the apparatus according to the present invention may be realized in an extremely simple manner by the passage of but one four conductor signal cable between the control equipment of each individual boiler. The switches may suitably consist of transistor switches or the like. In FIG. 2, the signal "permission to reduce" may be impressed on all boilers, whereas the signal "permission to increase" may be impressed only on the first boiler.

As soon as the boiler 1 begins to increase its output, the switch for the signal "permission to reduce" will be opened.

In most cases, the control equipment of such boilers is disposed to permit leapfrog increase and reduction of the output and one example of such control equipment includes fifteen steps with a step time of 10–20 seconds per step. It may thus be said that the switch for the signal "permission to reduce" is opened when the first control step is made and remains open as long as any step is made. When the boiler has reached th final step, the switch for the signal "permission to increase" is made, whereafter the boiler 2 begins stepwise to increase output and thereby its switch for the signal "permission to reduce" is opened, the entire regulation proceeding thus.

In each unit of control equipment, there are also means for generating, in the event of an overload of more than, for example, 105 above a preset value, the signal "permission to reduce", and the signal "permission to increase" whereby the function will be the same as in the event of excess temperature.

In the event of excess temperature or overload, the priority ranking which is realized by means of the apparatus according to FIGS. 1 and 2, will be broken whereby an "early" boiler in the system may reduce or step down in output without any compensatory increase being made by the subsequent boilers. Thus, the subsequent boilers cannot increase their output until the "early" boiler has returned to full output running.

I claim:

1. An apparatus for controlling a number of boilers which each are provided with their control equipment and are, in terms of water engineering, interconnected in series in such a manner that return water from the circulation system enters the first boiler in the series and continues through the other boilers and is thereafter redischarged into the circulation system, characterized in that the control equipment is provided with a first switch means associated with a boiler for providing a signal which enables the control equipment of a following boiler in the series-connection to increase the output of the following boilers, and second switch means associated with a boiler for providing a signal which enables the control equipment of a preceding boiler in the series-coupling to reduce its output.

2. Apparatus for controlling a plurality of boilers which have their water systems connected in series and arranged so that water from a circulation system flows serially through the boilers before being redischarged to the circulation system, a first said boiler and a second said boiler, said second boiler having a water system which is subsequent in the series to the first boiler, a first switch means which is responsive to the power output of the first boiler and is operable when the power output of the first boiler rises to a given level to provide a signal which enables the second boiler to increase its power output, and a second switch means which is responsive to the power output of the second boiler and is operable when the power output of the second boiler decreases to a predetermined level to enable the first boiler to reduce its power output.

3. An apparatus according to claim 1, characterized in that there is a plurality of first switch means which are interconnected in series and are connected to a signal source, and there is a plurality of second switch means which are interconnected in series and are connected to a signal source.

4. An apparatus according to claim 1, characterized in that the control equipment is operative to close the first switch means at a certain high output level, for example full output of the boiler for providing a signal "permission to increase" to the control equipment of the subsequent boiler, said second switch means being operable to close at a certain low output level, for example zero output of the boiler to provide a signal "permission to reduce" to the control equipment of the preceding boiler.

5. An apparatus according to claim 1 characterized in that the switch means are electronic, for example transistor switches, said switch means being connected to signal sources which have a voltage level.

6. An apparatus according to claim 1 characterized in that the control equipment of a boiler includes an excess temperature sensor means which provides said boiler with a signal "permission to reduce", whether or not the boiler has received the signal from the subsequent boiler in the series, said excess temperature sensor means on reduction of the output, being operable to break the signal "permission to increase" in order to prevent subsequent boilers in the series from compensating.

7. An apparatus according to claim 6, characterized in that each control equipment is operative, in the event of an overload of more than an amount above a preset value, internally to generate the signal "permission to reduce" and the signal "permission to increase".

8. An apparatus according to claim 3, characterized in that the switch means are electronic, for example transistor switches, said switch means being connected to signal sources which have a voltage level.

9. An apparatus according to claim 4, characterized in that the switch means are electronic, for example transistor switches, said switch means being connected to signal sources which have a voltage level.

10. An apparatus according to claim 4, characterized in that the control equipment of a boiler includes an excess temperature sensor means which provides said boiler with a signal "permission to reduce", whether or not the boiler has received the signal from the subsequent boiler in the series, said excess temperature sensor means, on reduction of the output, being operable to break the signal "permission to increase" in order to prevent subsequent boilers in the series from compensating.

11. An apparatus according to claim 10, characterized in that said control equipment is operative, in the event of an overload of more than an amount above a preset value, internally to generate the signal "permission to reduce" and the signal "permission to increase".

* * * * *